United States Patent
Yoo

(10) Patent No.: US 8,922,151 B2
(45) Date of Patent: Dec. 30, 2014

(54) REGENERATIVE MEDIUM VOLTAGE INVERTER

(75) Inventor: An No Yoo, Seoul (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 245 days.

(21) Appl. No.: 13/615,608

(22) Filed: Sep. 14, 2012

(65) Prior Publication Data

US 2013/0093376 A1 Apr. 18, 2013

(30) Foreign Application Priority Data

Oct. 12, 2011 (KR) ................. 10-2011-0104296

(51) Int. Cl.
G05D 23/275 (2006.01)
H02M 7/49 (2007.01)
H02M 1/12 (2006.01)
H02M 5/458 (2006.01)

(52) U.S. Cl.
CPC ............. *H02M 7/49* (2013.01); *H02M 1/126* (2013.01); *H02M 5/4585* (2013.01)
USPC .......................................... 318/632; 318/629

(58) Field of Classification Search
USPC ................. 318/727, 800, 801, 802, 632, 629
See application file for complete search history.

(56) References Cited

U.S. PATENT DOCUMENTS

| | | | | |
|---|---|---|---|---|
| 4,445,167 A | * | 4/1984 | Okado | 363/56.02 |
| 4,794,353 A | * | 12/1988 | Broyde | 333/167 |
| 5,625,545 A | * | 4/1997 | Hammond | 363/71 |
| 5,990,654 A | * | 11/1999 | Skibinski et al. | 318/800 |
| 6,014,323 A | | 1/2000 | Aiello et al. | |
| 6,414,323 B1 | * | 7/2002 | Abe et al. | 250/443.1 |
| 6,847,531 B2 | * | 1/2005 | Bixel | 363/71 |
| 7,088,073 B2 | * | 8/2006 | Morishita | 318/801 |
| 7,307,400 B2 | * | 12/2007 | Rastogi et al. | 318/801 |
| 7,508,147 B2 | | 3/2009 | Rastogi et al. | |
| 2007/0058405 A1 | | 3/2007 | Bousfield et al. | |

FOREIGN PATENT DOCUMENTS

| | | |
|---|---|---|
| CN | 101263646 | 9/2008 |
| DE | 102005005688 | 8/2006 |
| JP | 2005-348573 A | 12/2005 |
| JP | 2006-230027 A | 8/2006 |
| JP | 2007-124827 A | 5/2007 |
| JP | 2009-106081 A | 5/2009 |
| JP | 2009-165269 A | 7/2009 |

OTHER PUBLICATIONS

European Patent Office Application Serial No. 12181824.9, Search Report dated Apr. 28, 2014, 7 pages.
The State Intellectual Property Office of the People's Republic of China Application 201210387267.1, Office Action dated Jul. 30, 2014, 8 pages.

* cited by examiner

*Primary Examiner* — Rina Duda
(74) *Attorney, Agent, or Firm* — Lee, Hong, Degerman, Kang & Waimey

(57) ABSTRACT

Provided is a regenerative medium voltage inverter, the inverter being such that regenerative operation is enabled by changing structure of input terminal of a unit power cell at a series H-bridge medium voltage inverter, and a dynamic braking resistor is not required to reduce the size of a DC-link capacitor over that of a conventional medium voltage inverter.

8 Claims, 8 Drawing Sheets

REGENERATIVE MEDIUM VOLTAGE INVERTER

Pursuant to 35 U.S.C. §119 (a), this application claims the benefit of earlier filing date and right of priority to Korean Patent Application No. 10-2011-0104296, filed on Oct. 12, 2011, the contents of which is hereby incorporated by reference in their entirety.

BACKGROUND OF THE DISCLOSURE

1. Field of Endeavor

The present disclosure relates to a regenerative medium voltage inverter.

2. Background

This section provides background information related to the present disclosure which is not necessarily prior art.

In general, equipment referred to as a power converter, inverter or drive is employed to provide power to another piece of equipment such as a motor. Specifically, such an inverter (inverter is used generally herein to refer to inverters, converters, drives) is coupled to a utility connection to receive incoming input power such as a three-phase AC (Alternating Current) power. Furthermore, a medium voltage inverter is an inverter having an input power whose rms (root mean square) value is over 600V for a line-to-line voltage, and is generally used to drive an industrial load of large inertia of, for a non-limiting, fans, pumps and compressors.

In these application fields, variable speed operations frequently occur, where regenerative operations are generated, if a fast acceleration or a fast deceleration is required.

FIG. 1 is a configurative view of a series H-bridge medium voltage inverter according to prior art, where the inverter is configured with a three-step unit power cells.

A conventional medium voltage inverter (100) receives a 3-phase power from an input power unit (200) and supplies the power to a motor (300). The input power unit (200) provides a 3-phase whose rms (root mean square) value is over 600V for a line-to-line voltage. The motor (300) is a 3-phase high voltage motor, and may be an induction machine or a synchronous machine.

A phase switching transformer (110) provides a galvanic isolation between the input power unit (200) and the medium voltage inverter (100), reduces harmonics at an input terminal and provides an input 3-phase power adequate to each unit power cell (120). The unit power cell (120) receives the power from the phase switching transformer (110) and outputs a phase voltage to the motor (300), where each unit power cell (120) is composed of a group.

Referring to FIG. 1, the power cells A1, A2 and A3 are connected in series at an output voltage to synthesize 'a' phase voltage of the motor (300), the power cells B1, B2 and B3 are connected in series at an output voltage to synthesize 'b' phase voltage of the motor (300), and the power cells C1, C2 and C3 are connected in series at an output voltage to synthesize 'c' phase voltage of the motor (300). The synthesized 'b' phase voltage and 'a' phase voltage are apart with a 120 degree phase difference, and the synthesized 'c' phase voltage and 'b' phase voltage are also apart with a 120 degree phase difference.

FIG. 2 is a configurative view illustrating a unit power cell of FIG. 1. Referring to FIG. 2, the unit power cell (120) includes a 3-phase diode rectifier (121), a DC-link capacitor (122) and an inverter (123). The 3-phase diode rectifier (121) outputs a 3-phase rectified DC voltage using an output voltage of the phase switching transformer (110) as an input. The DC-link capacitor (122) stores the input power of the 3-phase diode rectifier (121). The inverter (123) is a single phase full bridge inverter to synthesize output voltages via switching of the switching elements (123a~123d) using the voltages received from the DC-link capacitor (122).

Now, system of FIGS. 1 and 2 will be described.

The phase switching transformer (110) converts a phase and size of a high voltage input power catering to requirement of the unit power cell (120). An output voltage of the phase switching transformer (110) becomes of an input power of each unit power cell (120) and is converted to a DC through the 3-phase diode rectifier (121) of FIG. 2. The DC-link capacitor (122) serves to constantly maintain the output voltage of the 3-phase diode rectifier (121).

The single phase full bridge inverter (123) synthesizes the AC output voltages with the voltages from the DC-link capacitor (122). IF the voltage of the DC-link capacitor (122) is assumed as 'E', an output voltage of the inverter (123) would be shown as 'E', 'O' and '−E' according to switching state.

For a non-limiting example, if 123a and 123d are electrically conducted, the synthesized output voltage is 'E', and if 123b and 123c are electrically conducted, the synthesized output voltage is '−E', if 123a and 123c, or 123b and 123d are electrically conducted, the synthesized output voltage is '0'.

In the unit power cell structure of FIG. 1, output voltages of A1, A2, A3, B1, B2, B3 and C1, C2, C3 are all serially connected, such that serially connected output phase voltages are synthesized in 7 steps of '3E', '2E', 'E', '0', '−E', '−2E, and '−3E'. An output line-to-line voltage of the motor from the synthesized output phase voltages may be synthesized in 13 steps of '6E', '5E', '4E', '3E', '2E', 'E', '0', '−E', '−2E', '−3E', '−4E', '−5E', '−6E', which may be generalized as below.

$$m=2H+1 \quad \text{[Equation 1]}$$

$$p=2m-1=4H+1 \quad \text{[Equation 2]}$$

where, m is a level number of output phase voltage, H is the number of unit power cells (120) installed at each phase of motor (300), and p is the level number of output line-to-line voltages. Meanwhile, with an output of each unit power cell (120) being an output of a single full bridge inverter, an output of a DC-link power is formed with a voltage ripple. First, an output voltage and an output current of each cell are defined as under.

$$v_O = \sqrt{2} V_O \sin \omega t \quad \text{[Equation 3]}$$

$$i_o = \sqrt{2} I_o \sin(\omega t - \phi) \quad \text{[Equation 4]}$$

where, $\phi$ is a load angle, $\omega$ is an operating frequency, t is time, $V_O$ and $I_o$ are an output voltage and an rms value of an output current. An output power of unit power cell (120) can be obtained as below based on the Equations 3 and 4.

$$p_o = v_o i_o = V_o I_o \cos \phi - V_o I_o \cos(2\omega t - \phi) \quad \text{[Equation 5]}$$

As noted from the Equation 5, it can be learned that an output of unit power cell (120) is divided to a DC component of $V_o I_o \cos \phi$ and an AC component of $V_o I_o \cos(2\omega t - \phi)$, where the AC component has a ripple corresponding to twice that of the operating frequency. Now, a current flowing in DC link can be obtained as below.

$$i_{DC} = \frac{p_o}{v_{DC}} = \frac{V_o I_o}{v_{DC}} \cos\phi - \frac{V_o I_o}{v_{DC}} \cos(2\omega t - \phi) \quad \text{[Equation 6]}$$

Based on the Equations 5 and 6, it can be learned that the DC link is generated with a ripple twice that of the operating frequency.

The conventional series H-bridge medium voltage inverter thus described suffers from a disadvantage in that, because it is formed with a diode rectifier for an input terminal of a unit power cell, it is impossible to perform a regenerative operation to make it difficult to perform a fast acceleration or a fast deceleration.

As a result, the conventional series H-bridge medium voltage inverter thus described has a disadvantage of taking a long time for decelerated operation during a decelerated operation. Another disadvantage is that each capacitance of DC-link capacitor of all unit power cells must be enlarged to increase the size of an entire system.

Thus, there is a need to address the abovementioned disadvantages.

SUMMARY OF THE DISCLOSURE

This section provides a general summary of the disclosure, and is not a comprehensive disclosure of its full scope or all of its features.

The present disclosure is provided to solve the aforementioned disadvantages and it is an object of the present disclosure to provide a partial regenerative medium voltage inverter configured to combine a conventional series H-bridge medium voltage inverter with a regenerative unit power cell having an active rectifier capable of performing a regenerative operation.

It should be emphasized, however, that the present disclosure is not limited to a particular disclosure, as explained above. It should be understood that other technical subjects not mentioned herein may be appreciated by those skilled in the art.

In one general aspect of the present disclosure, there is provided a regenerative medium voltage inverter, the inverter comprising: a plurality of power cells configured to transmit, by serially-connected three groups, a phase voltage to a motor; a plurality of input filters interconnected between an input power unit and the power cell to reduce harmonics of a 3-phase input power; and a plurality of switching signal generating units interconnected between an input power unit and the power cell to switch a voltage inputted to the power cell.

Preferably, but not necessarily, the inverter further comprises a phase switching transformer electrically insulating the input power from the input power unit and providing the electrically insulated input power to each of the plurality of power cells.

Preferably, but not necessarily, the input filter is mounted with three input terminals receiving the input power, and comprises inductors respectively connected to the input terminals, and capacitors connected with the inductors in a delta connection.

Preferably, but not necessarily, the input filter further comprises resistors connected in parallel to each of the inductors to remove resonance of the input power.

Preferably, but not necessarily, the power cell comprises an active rectifying unit receiving an output voltage of the input filter to output a DC (direct current) voltage rectified from the output voltage, a DC-link capacitor storing the DC voltage, and an inverter unit synthesizing output voltage from the stores DC voltage.

Preferably, but not necessarily, the active rectifying unit comprises a plurality of switches connected in parallel to each phase voltage.

Preferably, but not necessarily, the switching signal generating unit controls the plurality of switches to sequentially connect the power cell and the input power unit.

Preferably, but not necessarily, each of the switches comprises a transistor and a diode that are connected in parallel.

Preferably, but not necessarily, the switching signal generating unit measures a line-to-line voltage using the input power from the input power unit, extracts a power angle using the measured line-to-line voltage and switches the voltage inputted to the power cell.

The regenerative medium voltage inverter according to exemplary embodiments of the present disclosure has an advantageous effect in that regenerative operation is enabled by changing structure of input terminal of a unit power cell at a series H-bridge medium voltage inverter, and a dynamic braking resistor is not required to reduce the size of a DC-link capacitor over that of a conventional medium voltage inverter.

BRIEF DESCRIPTION OF THE DRAWINGS

In order to explain the principle of the present disclosure, some accompanying drawings related to its preferred embodiments are below reported for the purpose of illustration, exemplification and description, although they are not intended to be exhaustive. The drawing figures depict one or more exemplary embodiments in accord with the present concepts, by way of example only, not by way of limitations. In the figures, like reference numerals refer to the same or similar elements.

Thus, a wide variety of potential practical and useful embodiments will be more readily understood through the following detailed description of certain exemplary embodiments, with reference to the accompanying exemplary drawings in which.

DETAILED DESCRIPTION

Figure 1:
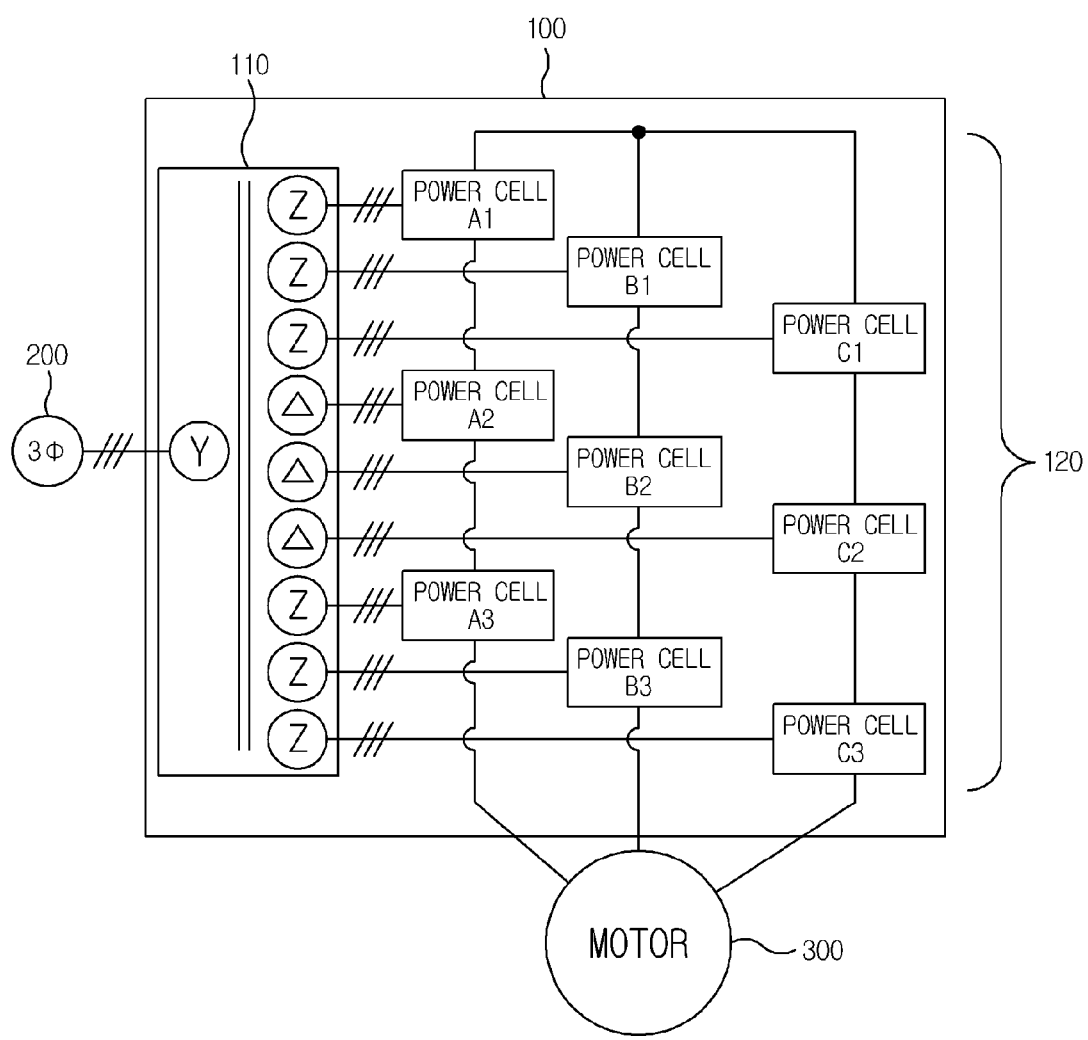
FIG. 1 is a structural view illustrating a series H-bridge medium voltage inverter according to prior art.

The disclosed embodiments and advantages thereof are best understood by referring to FIGS. 1-8 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented. Accordingly, the described aspect is intended to embrace all such alterations, modifications, and variations that fall within the scope and novel idea of the present invention.

Meanwhile, the terminology used herein is for the purpose of describing particular implementations only and is not intended to be limiting of the present disclosure. The terms "first," "second," and the like, herein do not denote any order, quantity, or importance, but rather are used to distinguish one element from another. For example, a second constituent element may be denoted as a first constituent element without departing from the scope and spirit of the present disclosure, and similarly, a first constituent element may be denoted as a second constituent element.

As used herein, the terms "a" and "an" herein do not denote a limitation of quantity, but rather denote the presence of at least one of the referenced item. That is, as used herein, the singular forms "a", "an" and "the" are intended to include the plural forms as well, unless the context clearly indicates otherwise.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Also, "exemplary" is merely meant to mean an example, rather than the best. If is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated.

That is, in the drawings, the size and relative sizes of layers, regions and/or other elements may be exaggerated or reduced for clarity. Like numbers refer to like elements throughout and explanations that duplicate one another will be omitted. As may be used herein, the terms "substantially" and "approximately" provide an industry-accepted tolerance for its corresponding term and/or relativity between items.

Hereinafter, a regenerative medium voltage inverter according to the present disclosure will be described in detail with reference to the accompanying drawings.

Figure 3:
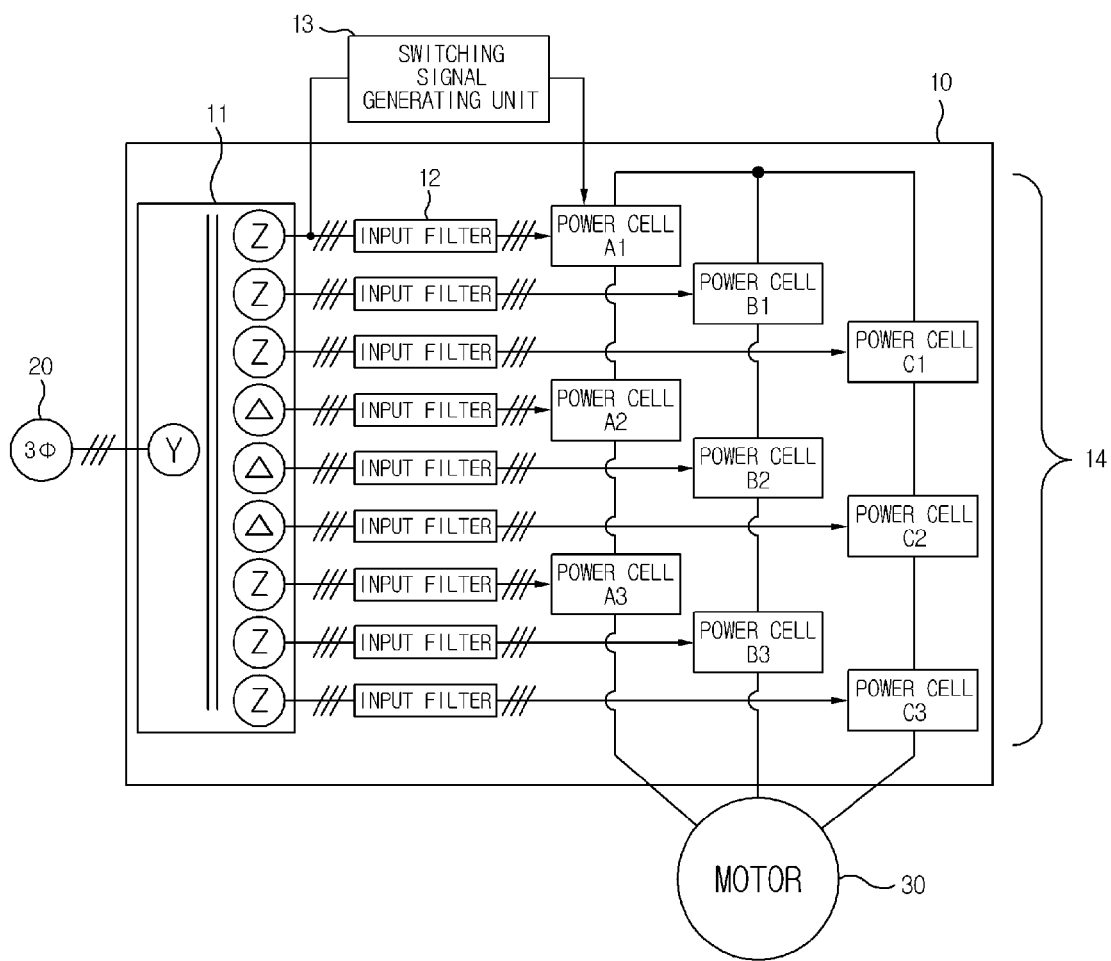
FIG. 3 is a structural view illustrating a regenerative medium voltage inverter according to an exemplary embodiment of the present disclosure.

FIG. 3 is a structural view illustrating a regenerative medium voltage inverter according to an exemplary embodiment of the present disclosure, where a series H-bridge medium voltage inverter is exemplified.

However, it should be apparent to the skilled in the art that, although the regenerative medium voltage inverter configured with a 3-level unit power cell is exemplified, the present disclosure is not limited thereto, and the number of unit power cells may be changed as required.

A regenerative medium voltage inverter (10) according to the present disclosure is an inverter that receives a voltage, whose rms (root mean square) value is over 600V in line-to-line voltage, from an input power unit (20) and supplies a 3-phase power to a motor (30). Preferably, the motor (30) is an induction motor or a synchronous motor but is not limited thereto.

Referring to FIG. 3, the regenerative medium voltage inverter (10) includes a phase shift transformer (11), a plurality of input filters (12), a plurality of switching signal generating units (13) and a plurality of power cells (14). FIG. 3 exemplifies a 3-level unit power cell, such that the number of power cells (14) providing the 3-phase voltage to the motor (30) totals 9, and the number of input filters (12) and the switching signal generating units (13), being respectively connected to the power cells (14), totals 9 respectively in the present disclosure. However, it should be apparent to the skilled in the art that those numbers may be changed according to the number of power cells (14).

Although only one switching signal generating unit (13) is illustrated as transmitting signal to A1 in FIG. 3 for convenience sake, it is not limited thereto and it should be apparent that the switching signal generating unit (13) is mounted to each of the power cells.

The phase shift transformer (11) serves to provide an electrical insulation between the input power unit (20) and the regenerative medium voltage inverter (10), to reduce harmonics from the input power and to provide a 3-phase power to each power cell (14). The input filter (12) functions to reduce harmonics from the input power.

Figure 4:
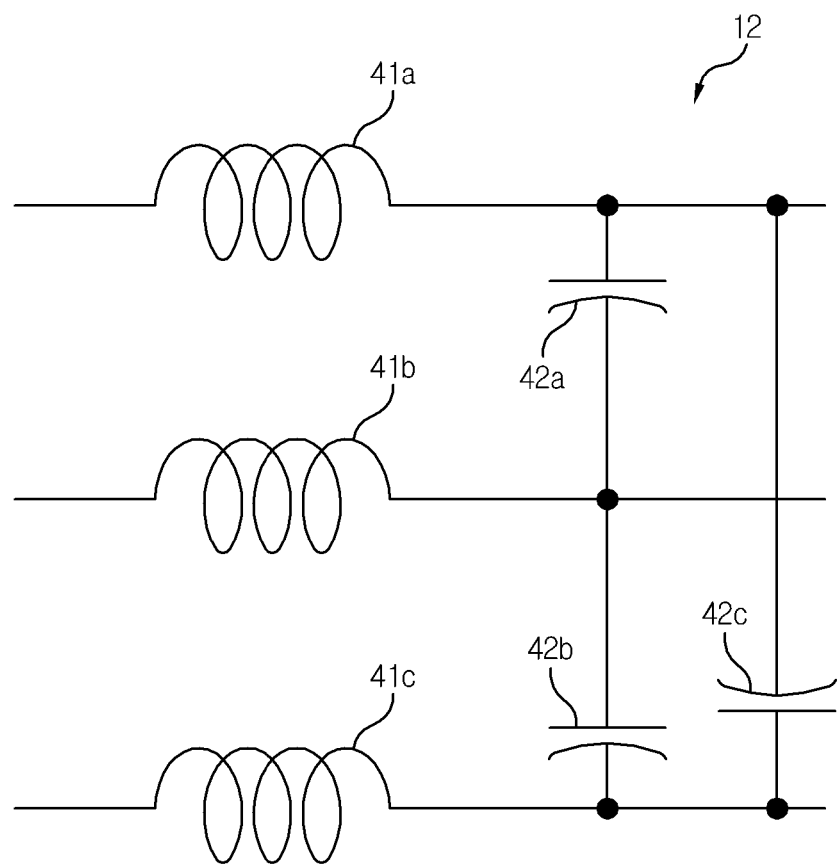
FIG. 4 is a detailed structural view illustrating an input filter of FIG. 3 according to an exemplary embodiment of the present disclosure.
Figure 5:
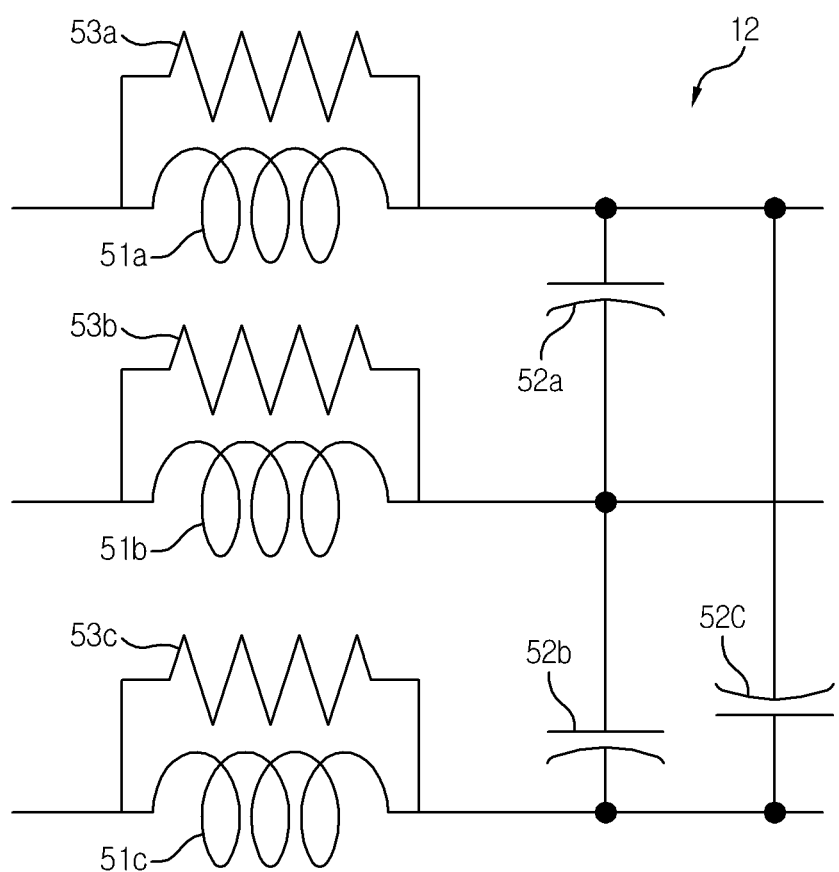
FIG. 5 is a detailed structural view illustrating an input filter of FIG. 3 according to another exemplary embodiment of the present disclosure.

FIG. 4 is a detailed structural view illustrating an input filter of FIG. 3 according to an exemplary embodiment of the present disclosure, and FIG. 5 is a detailed structural view illustrating an input filter of FIG. 3 according to another exemplary embodiment of the present disclosure.

Referring to FIG. 4, the input filter (12) includes inductors (41a~41c) respectively connected in series to the 3-phase output of secondary winding side of the phase shift transformer (11) {To this end, the input filter (12) is formed with three input terminals}, and capacitors (42a~42c) connected to the inductors (41a~41c) in a delta connection.

Now, referring to FIG. 5, the input filter (12) according to another exemplary embodiment of the present disclosure includes inductors (51a~51c) respectively connected in series to the 3-phase output of secondary winding side of the phase shift transformer (11) {To this end, the input filter (12) is formed with three input terminals}, capacitors (52a~52c) connected to the inductors (51a~51c) in delta connection, and damping resistors (53a~53c) respectively connected in parallel to the inductors (51a~51c). The damping resistors (53a~53c) serve to remove resonance in the input voltage, if the resonance is generated in the input voltage.

The unit power cell (14) functions to output a phase voltage of the motor (30), and each unit power cell (14) is formed with three groups that are connected in series. In FIG. 3, A1, A2 and A3 are serially connected at output voltages to synthesize 'a' phase voltage of the motor (30), B1, B2 and B3 are serially connected at output voltages to synthesize 'b' phase voltage of the motor (30), and C1, C2 and C3 are serially connected at output voltages to synthesize 'c' phase voltage of the motor (30). The synthesized 'b' phase and 'a' phase voltages have a 120° phase difference, and the synthesized 'c' phase and 'b' phase voltages also have a 120° phase difference.

Figure 6:
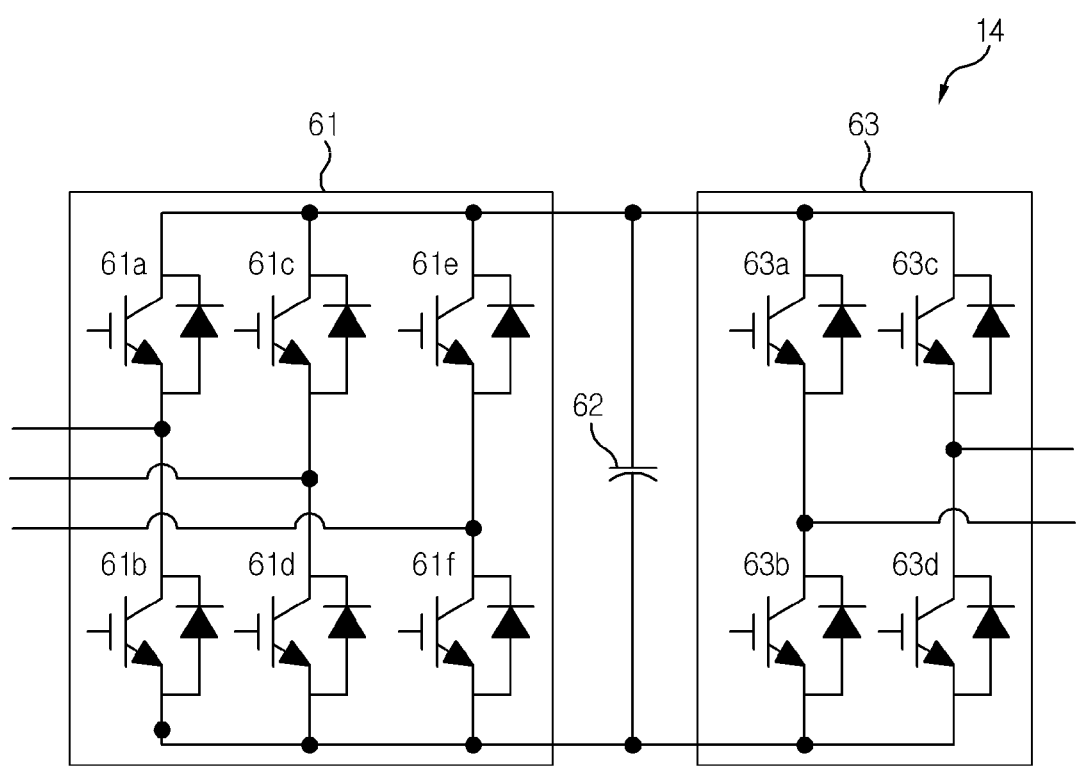
FIG. 6 is a detailed structural view illustrating a power cell of FIG. 3 according to an exemplary embodiment of the present disclosure.

FIG. 6 is a detailed structural view illustrating a power cell of FIG. 3 according to an exemplary embodiment of the present disclosure, where each of the plurality of power cells (14) has the same structure.

Referring to FIG. 6, the power cell (14) includes an active rectifying unit (61), a DC-link capacitor (62) and an inverter unit (63).

An input of the active rectifying unit (61) is an output voltage of the input filter (12) of FIG. 3, from which a DC rectified from the 3-phase voltage is outputted. The active rectifying unit (61) includes six transistor switches (hereinafter referred to as switch, 61a~61f), where the transistor is preferably an IGBT (Insulated Gate Bipolar Transistor), as shown in FIG. 6. The DC-link capacitor (62) stores an input power of the active rectifying unit (61).

The inverter unit (63) is preferably a single phase full bridge inverter to synthesize output voltages form a voltage of the DC link in response to control of a controller (not shown). The inverter unit (63) includes four switches (63a~63d), and each switch is formed by connecting in parallel a transistor and a diode. Now, a circuit of FIG. 3 will be described in detail with an emphasis on a difference from that of FIG. 1.

First, the input filter (12) of FIG. 3 configured as in FIG. 4 or FIG. 5 receives an output of the phase shift transformer (11), and inductances of inductors (41a~41c or 51a~51c) at the input filter (12) are sufficiently greater in value than those of leakage inductance of the phase shift transformer (11).

$$L_{filter} > 2L_{leakage\_2nd} \quad \text{[Equation 7]}$$

where, $L_{filter}$ is an inductance of inductors (41a~41c or 51a~51c) at the input filter (12), and $L_{leakage\_2nd}$ is a leakage inductance of the phase shift transformer (11) converted to a secondary winding side. Furthermore, capacitance of capacitors (42a~42c or 52a~52c) of FIG. 4 or FIG. 5 may be obtained from the following relations.

$$C_{filter} = \frac{1}{\sqrt{2L_{filter}\omega_c^2}} \quad \text{[Equation 8]}$$

where, $\omega_c$ is a cut-off frequency of input filter (12), and has a value six times greater than an input power frequency.

$$\omega_c > 12\pi\omega_{source}\left(\frac{rad}{s}\right) \quad \text{[Equation 9]}$$

where, $\omega_{source}$ is an input power frequency.

Meanwhile, a resistance having a maximum damping relative to damping resistors (53a~53c) of FIG. 5 is as under.

$$R_{damping} = \omega_c L_{filter} \quad \text{[Equation 10]}$$

An input line-to-line voltage measured by the input filter (12) determines the switching of the active rectifying unit of FIG. 6, where a measured position of the voltage is situated between the phase shift transformer (11) and the input filter (12).

Figure 7:
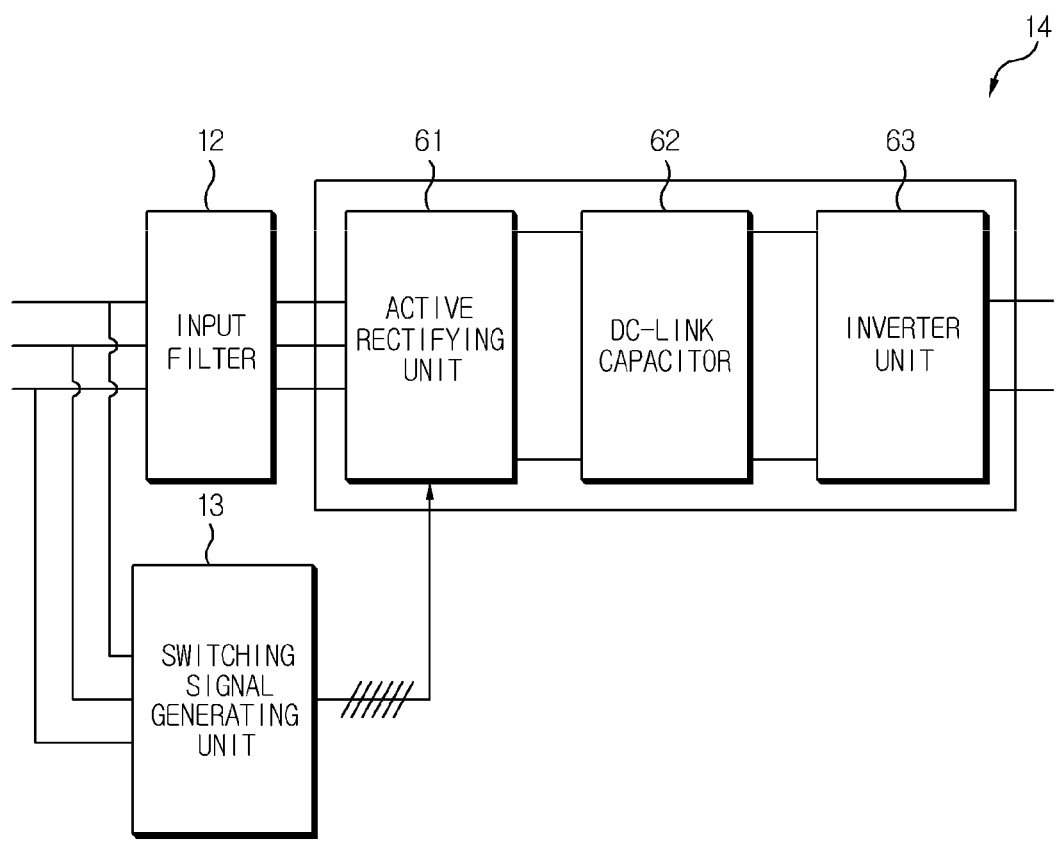
FIG. 7 is a schematic view illustrating an input filter connected to a power cell in FIG. 3 and a switching signal generating unit.

FIG. 7 is a schematic view illustrating an input filter connected to a power cell in FIG. 3 and a switching signal generating unit.

The switching signal generating unit (13) serves to generate a switching signal of the active rectifying unit (61). That is, the switching signal generating unit (13) measures an input line-to-line voltage from the 3-phase voltage inputted from the input filter (12), extracts an input power angle from the measured line-to-line voltage and transmits a gating signal, i.e., a switching signal to six transistors (61a~61f) of the active rectifying unit (61).

Figure 8:
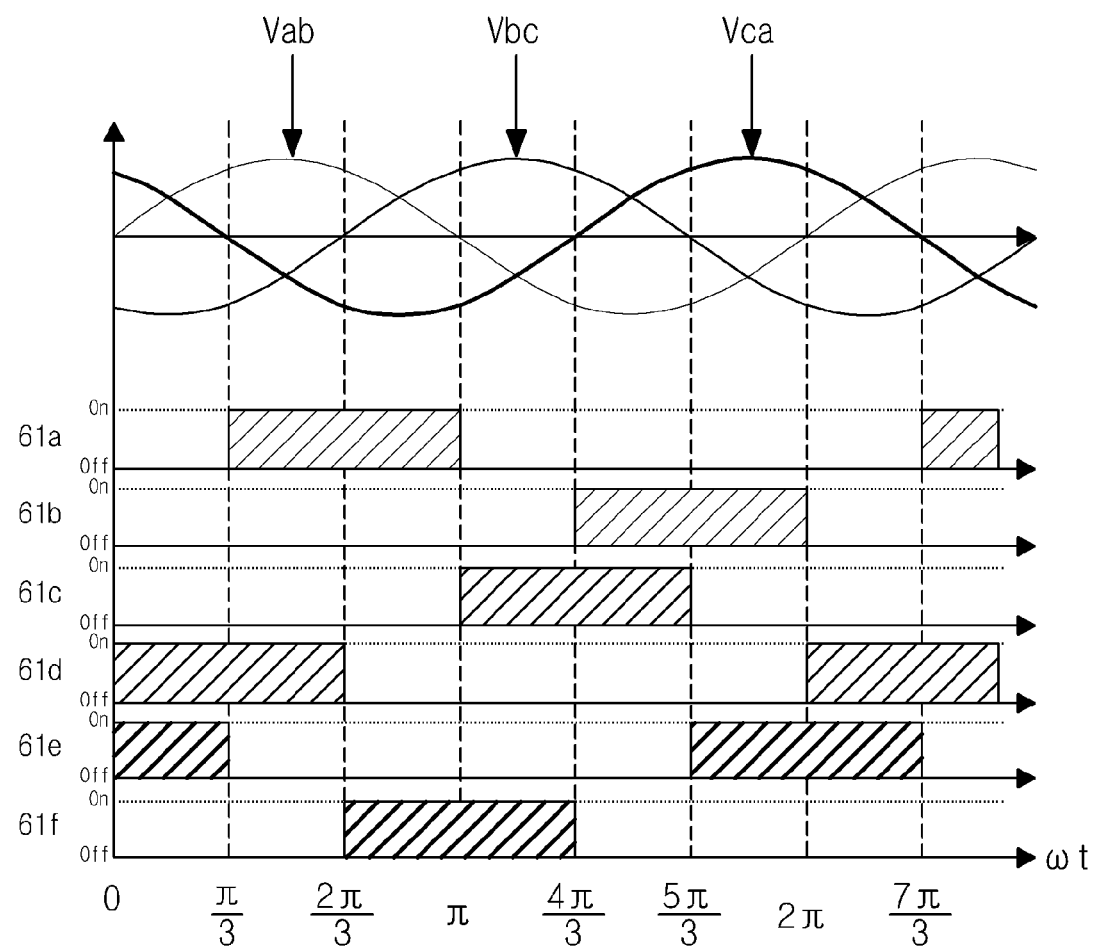
FIG. 8 is a schematic view illustrating a switching signal generated by the switching signal generating unit of FIG. 3 and a resultant switching of an active rectifying unit according to an exemplary embodiment of the present disclosure.

FIG. 8 is a schematic view illustrating a switching signal generated by the switching signal generating unit of FIG. 3 and a resultant switching of an active rectifying unit according to an exemplary embodiment of the present disclosure, where the switching signal generated by the switching signal generating unit of FIG. 3 in response to an input line-to-line voltage is exemplified.

Referring to FIG. 8, '$V_{ab}$' represents an ab line-to-line voltage, '$V_{bc}$' represents a bc line-to-line voltage and '$V_{ca}$' represents a ca line-to-line voltage, and the switching signal generating unit (13) transmits ON/OFF signals relative to switches (61a~61f) of the active rectifying unit (61) to each switch (61a~61f) of the transistors.

Referring to FIG. 8, it can be noted that the switching of the active rectifying unit has a same switching frequency as frequency of the input power.

That is, in a case the input power angle of $\omega_t$ is from 0 to $\pi/3$, switches of 61d and 61e of FIG. 6 are turned on, in a case the input power angle is from $\pi/3$ to $2\pi/3$, switches of 61a and 61d are turned on, and in a case the input power angle is from $2\pi/3$ to $\pi$, switches of 61a and 61f are turned on.

Furthermore, in a case the input power angle is from $\pi$ to $4\pi/3$, switches of 61c and 61f are turned on, in a case the input power angle is from $4\pi/3$ to $5\pi/3$, switches of 61b and 61c are turned on, and in a case the input power angle is from $5\pi/3$ to $2\pi$, switches of 61b and 61e are turned on.

The switching pattern is periodically repeated at every $2\pi$ in response to changes in input power angle, by which the power cell (14) including the active rectifying unit (61) is enabled for bi-directional power transmission.

Although FIG. 8 has illustrated the switching of the active rectifying unit (61) relative to the input line-to-line voltage, it should be apparent to the skilled in the art that an identical operation can be made by measuring an input phase voltage, which will be explained later.

The following represents relationship between an input line-to-line voltage and an input phase voltage.

$$E_a = \frac{V_{ab} - V_{ca}}{3} \quad \text{[Equation 11]}$$

$$E_b = \frac{V_{bc} - V_{ab}}{3} \quad \text{[Equation 12]}$$

$$E_c = \frac{V_{ca} - V_{bc}}{3} \quad \text{[Equation 13]}$$

In the above Equations 11, 12 and 13, $E_a$ is an input 'a' phase voltage, $E_b$ is an input 'b' phase voltage, and $E_c$ is an input 'c' phase voltage. The switching of FIG. 8 may be also applied to the phase voltage, because the phase voltage can be obtained from the line-to-line voltage.

By the switching of the switching signal generating unit (13), the active rectifying unit (61) is such that the switches (61a~61f) are operated at a point same as that of diode of the diode rectifying unit (21) being operated, whereby the phase shift transformer (11) and the power cell (14) are electrically and instantaneously connected to enable a regenerative operation.

In a case the phase shift transformer (11) and the power cell (14) are connected by the switching of FIG. 8, the following relationship occurs.

First, 'a' output voltage and current of a motor (30) may be defined by the following equations 14 and 15 respectively, and 'b' and 'c' output voltages and currents of the motor (30) may be also defined by the following equations 16, 17, 18 and 19 respectively.

$$v_{o\_a} = \sqrt{2}\, V_o \sin\omega t \qquad \text{[Equation 14]}$$

$$i_{o\_a} = \sqrt{2}\, I_o \sin(\omega t - \phi) \qquad \text{[Equation 15]}$$

$$v_{o\_b} = \sqrt{2}\, V_o \sin\left(\omega t - \frac{2}{3}\pi\right) \qquad \text{[Equation 16]}$$

$$i_{o\_b} = \sqrt{2}\, I_o \sin\left(\omega t - \frac{2}{3}\pi - \phi\right) \qquad \text{[Equation 17]}$$

$$v_{o\_c} = \sqrt{2}\, V_o \sin\left(\omega t + \frac{2}{3}\pi\right) \qquad \text{[Equation 18]}$$

$$i_{o\_b} = \sqrt{2}\, I_o \sin\left(\omega t + \frac{2}{3}\pi - \phi\right) \qquad \text{[Equation 19]}$$

where, $\phi$ is a load angle, $\omega$ is an operating frequency, t is time, $V_o$ and $I_o$ are rms values of output voltage and output current.

From Equations 14 and 15, power generated from 'a' phase of motor (30) can be obtained from the following Equation 20, and likewise, powers generated from 'b' phase and 'c' phase can be obtained from Equations 21 and 22.

$$\begin{aligned}p_{o\_a} &= v_{o\_a} i_{o\_a} \\ &= V_o I_o \cos\phi - V_o I_o \cos(2\omega t - \phi)\end{aligned} \qquad \text{[Equation 20]}$$

$$\begin{aligned}p_{o\_b} &= v_{o\_b} i_{o\_b} \\ &= V_o I_o \cos\phi - V_o I_o \cos \\ &= \left(2\omega t - \phi + \frac{2}{3}\pi\right)\end{aligned} \qquad \text{[Equation 21]}$$

$$\begin{aligned}p_{o\_c} &= v_{o\_c} i_{o\_c} \\ &= V_o I_o \cos\phi - V_o I_o \cos\left(2\omega t - \phi - \frac{2}{3}\pi\right)\end{aligned} \qquad \text{[Equation 22]}$$

Thus, size of entire power is shown only in DC components as shown in the following.

$$p_o = p_{o\_a} + p_{o\_b} + p_{o\_c} = 3 V_o I_o \cos\phi \qquad \text{[Equation 23]}$$

That is, as in Equation 23, according to the active rectifying unit (61) of the present disclosure, the phase shift transformer (11) and the power cell (14) are instantaneously connected to allow a system to output a predetermined power, whereby a DC-link capacitor of unit power cell (14) can be reduces in size over that of the conventional medium voltage inverter.

Figure 2:
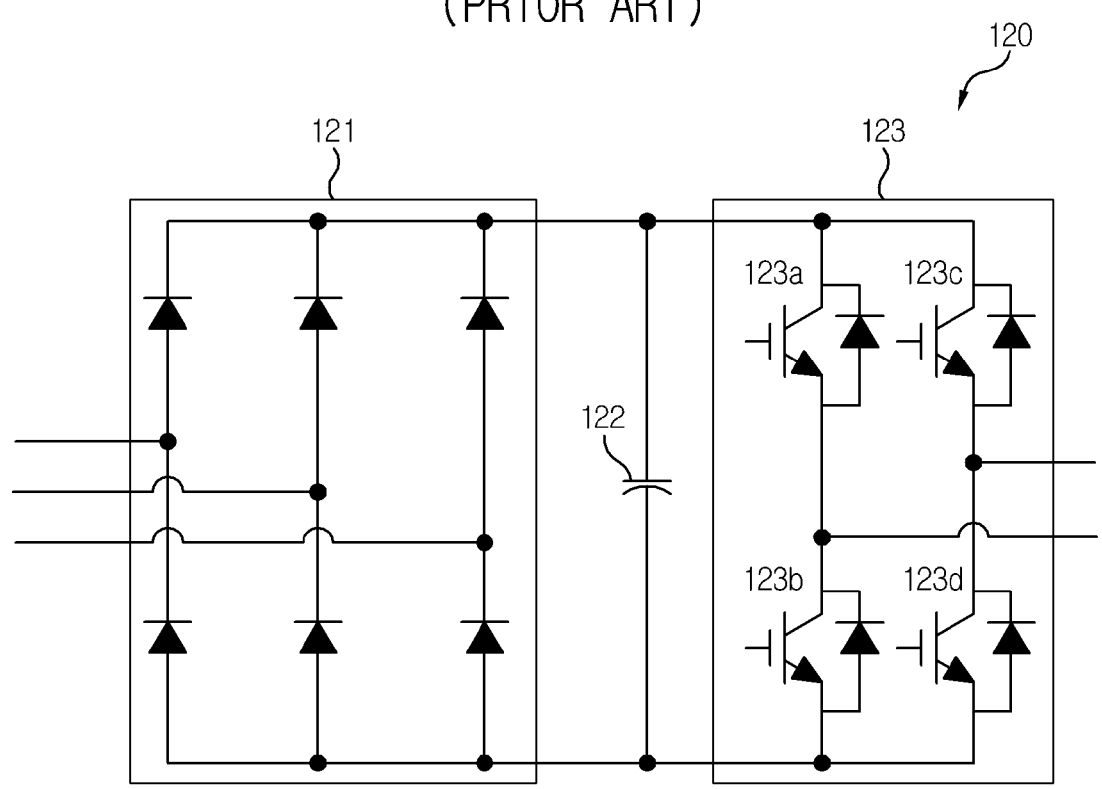
FIG. 2 is a structural view illustrating a unit power cell of FIG. 1.

The unit power cell having the conventional diode rectifying unit as shown in FIGS. 1 and 2 has a ripple twice the operating frequency in the power outputted by each unit power cell as shown in Equations 20, 21 and 22. There is a disadvantage of enlarging the size of a DC-link capacitor of the unit power cell in order to reduce the ripple.

However, the power cell (14) including the active rectifying unit (61) according to the present disclosure can advantageously reduce the size of the DC-link capacitor of each power cell (14), because an input terminal and an output terminal are instantaneously connected, a ripple power is not concentrated in the DC-link capacitor of each unit power cell, and a sum of 3-phase powers is available only in DC components as shown in Equation 23.

Although the present disclosure has been described with reference to a number of illustrative embodiments thereof, it should be understood that numerous other modifications and embodiments can be devised by those skilled in the art that will fall within the spirit and scope of the principles of this disclosure.

More particularly, various variations and modifications are possible in the component parts and/or arrangements of subject combination arrangement within the scope of the disclosure, the drawings and the appended claims. In addition to variations and modifications in the component parts and/or arrangements, alternative uses will also be apparent to those skilled in the art.

The regenerative medium voltage inverter according to exemplary embodiments of the present disclosure have an industrial applicability in that regenerative operation is enabled by changing structure of input terminal of a unit power cell at a series H-bridge medium voltage inverter, and a dynamic braking resistor is not required to reduce the size of a DC-link capacitor over that of a conventional medium voltage inverter.

What is claimed is:

1. A regenerative medium voltage inverter, the inverter comprising:
   a plurality of power cells to transmit a phase voltage to a motor via three serially-connected groups;
   a plurality of input filters each interconnected between an input power unit and one of the plurality of power cells to reduce harmonics of 3-phase input power; and
   a plurality of switching signal generating units each interconnected between the input power unit and one of the plurality of power cells to switch a voltage input to the corresponding power cell,
   wherein each of the plurality of power cells comprises:
   an active rectifying unit to rectify an output voltage of the corresponding input filter and to output a DC (direct current) voltage;
   a DC-link capacitor to store the DC voltage; and
   an inverter unit to synthesize the stored DC voltage.

2. The inverter of claim 1, further comprising a phase switching transformer to electrically insulate the input power from the input power unit and to provide the electrically insulated input power to each of the plurality of power cells.

3. The inverter of claim 1, wherein each of the plurality of input filters comprises:
   three input terminals to receive the input;
   an inductor connected to each input terminal; and
   capacitors connected to each inductor in a delta connection.

4. The inverter of claim 3, wherein each of the plurality of input filters further comprises a resistor connected in parallel to each of the inductors to remove resonance of the input power.

5. The inverter of claim 1, wherein the active rectifying unit comprises a plurality of switches connected in parallel to the phase voltage of each of the three serially-connected groups.

6. The inverter of claim 5, wherein the switching signal generating unit controls the plurality of switches to sequentially connect the corresponding power cell to the input power unit.

7. The inverter of claim 5, wherein each of the plurality of switches comprises a transistor and a diode connected in parallel.

8. The inverter of claim 1, wherein each of the plurality of switching signal generating units measures a line-to-line voltage using the input power from the input power unit, extracts a power angle using the measured line-to-line voltage and switches the voltage input to the power cell.

* * * * *